United States Patent [19]
Dawidowicz et al.

[11] 3,934,339
[45] Jan. 27, 1976

[54] RAZOR BLADE CARTRIDGE

[75] Inventors: Jan Dawidowicz, Fairfield; Frank A. Ferraro, Trumbull, both of Conn.

[73] Assignee: Warner-Lambert Company, Morris Plains, N.J.

[22] Filed: Sept. 21, 1973

[21] Appl. No.: 399,587

Related U.S. Application Data

[63] Continuation of Ser. No. 191,665, Oct. 22, 1971, Pat. No. 3,783,510.

[52] U.S. Cl. ................................................. 30/47
[51] Int. Cl.² ......................................... B26B 21/22
[58] Field of Search ............ 30/32, 40, 47, 50, 346, 30/59, 62–64, 84

[56] References Cited
UNITED STATES PATENTS

| | | | |
|---|---|---|---|
| 1,825,795 | 10/1931 | Heymann | 30/50 |
| 3,374,540 | 3/1968 | Louguyon | 30/62 |
| 3,724,070 | 4/1973 | Dorion | 30/84 X |
| 3,783,510 | 1/1974 | Dawidowicz | 30/50 X |

*Primary Examiner*—Al Lawrence Smith
*Assistant Examiner*—Gary L. Smith
*Attorney, Agent, or Firm*—Jeremiah J. Duggan; Albert H. Graddis

[57] ABSTRACT

The specific disclosure provides a razor blade cartridge having a pair of single edge blades which are tandemly mounted and vertically separated by a spacer. The blades and spacer are permanently bonded between a cap member and a blade seal member. Each of the blades has its cutting edge in abutting engagement with a respective pair of spaced stops. Means are provided for abutting engagement with the rear edges of the blades to prevent rearward movement thereof.

5 Claims, 24 Drawing Figures

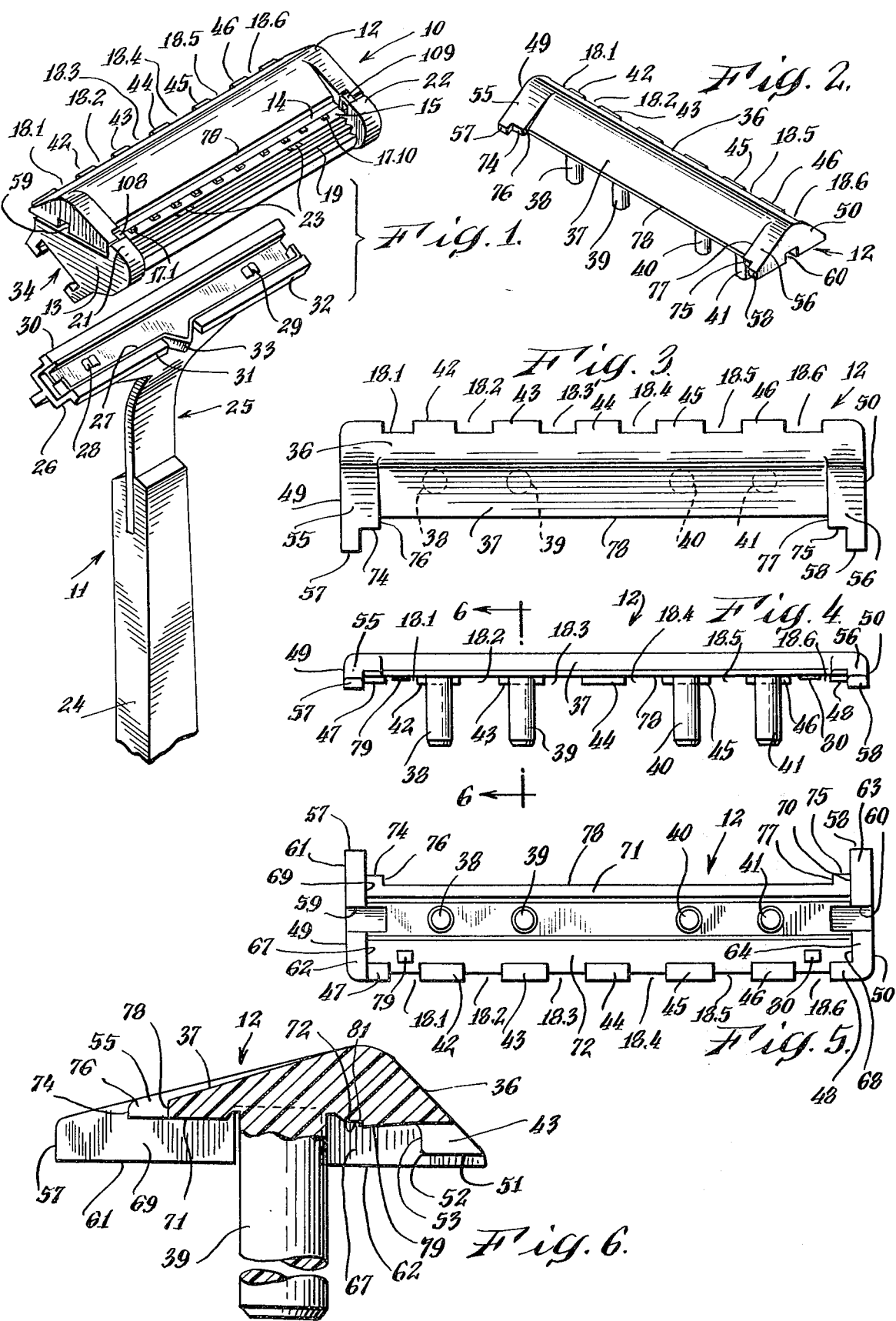

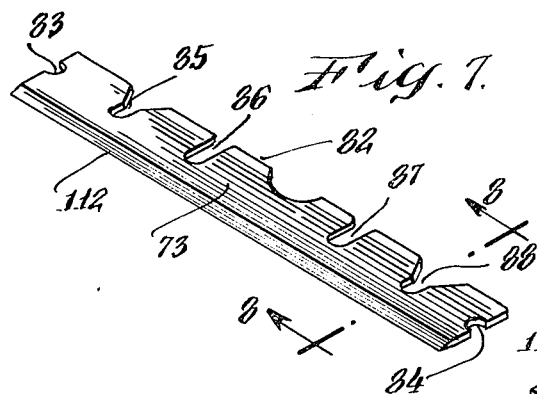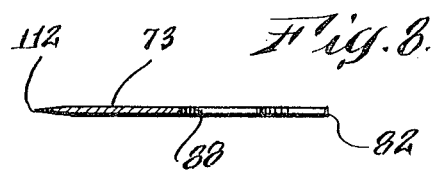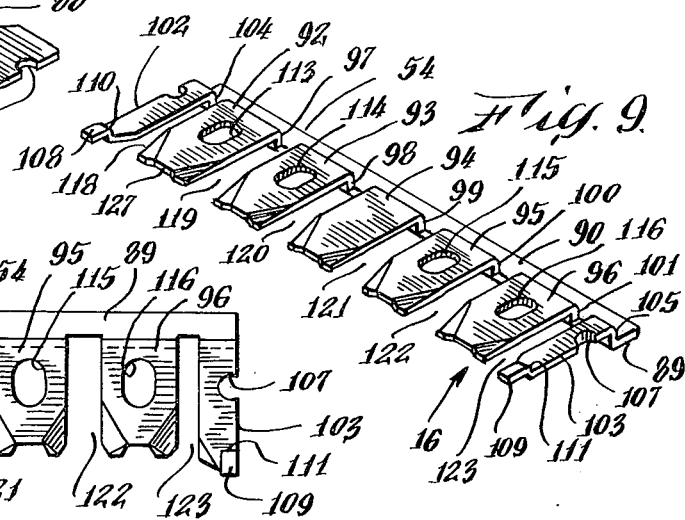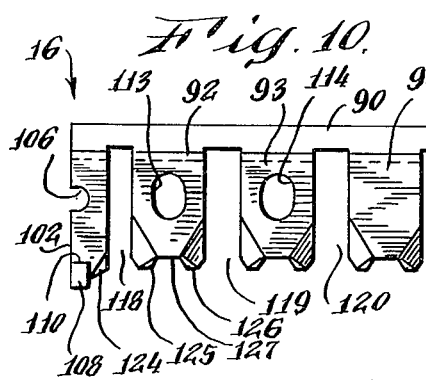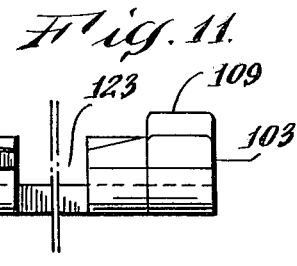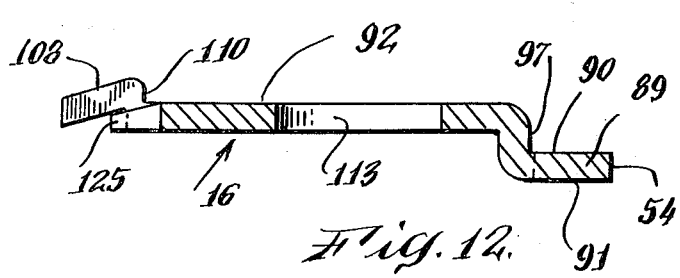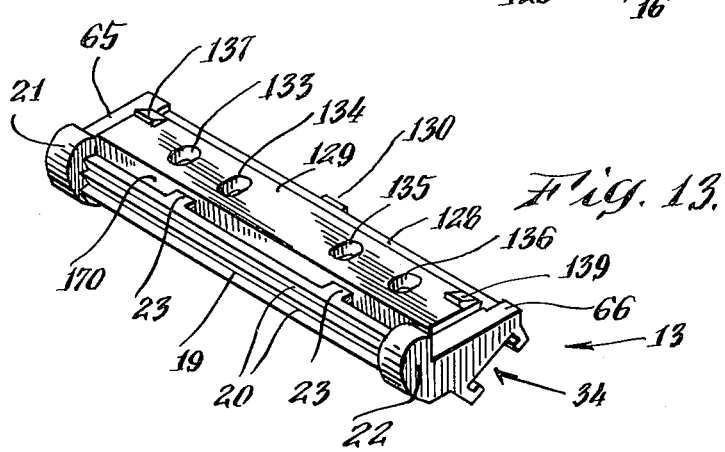

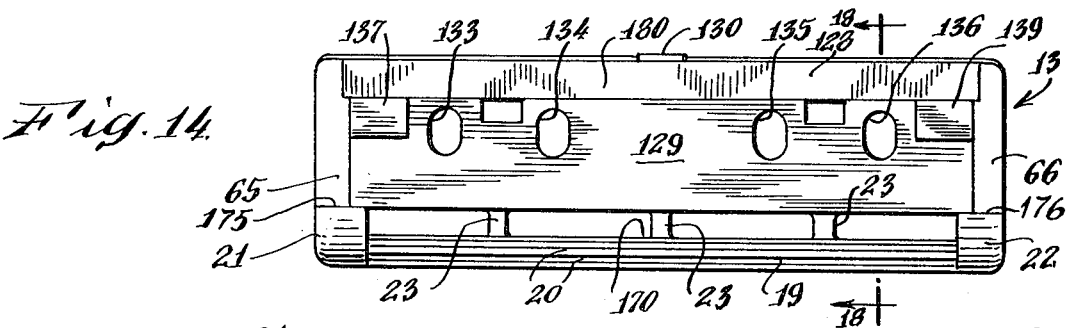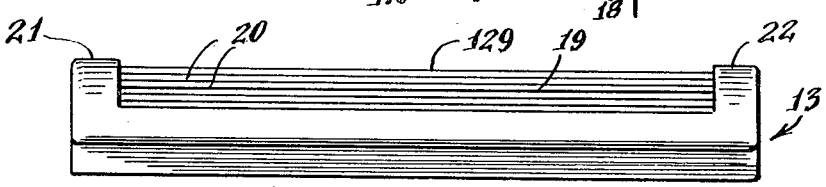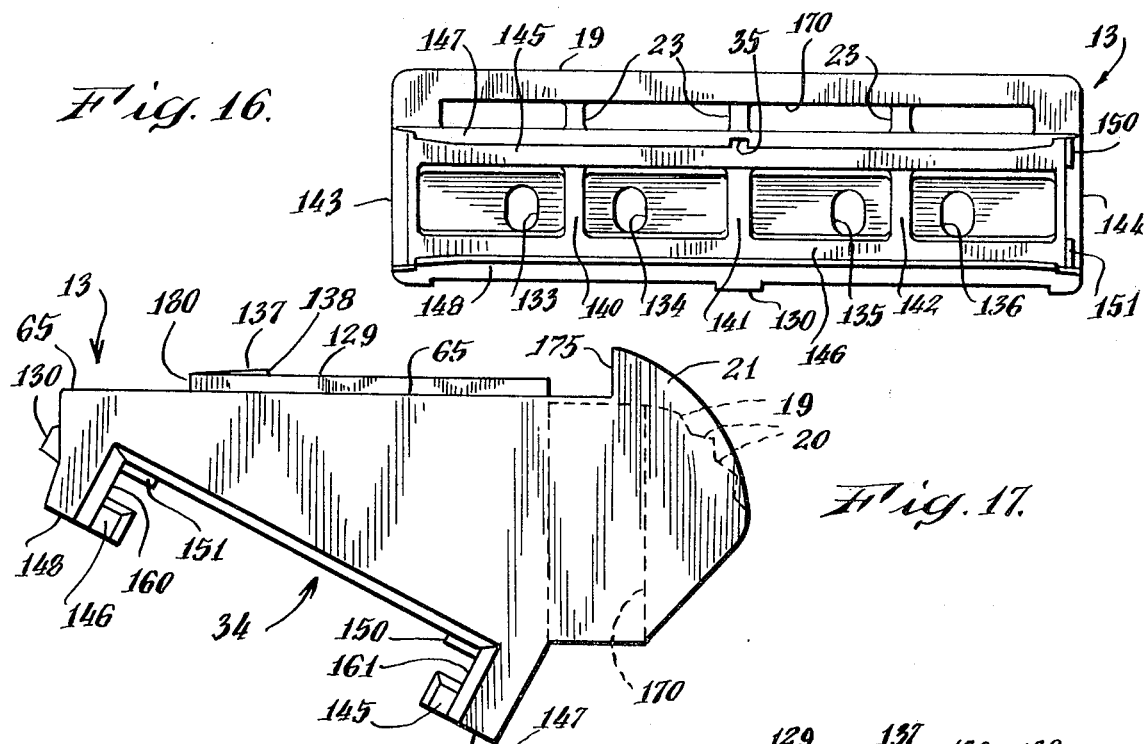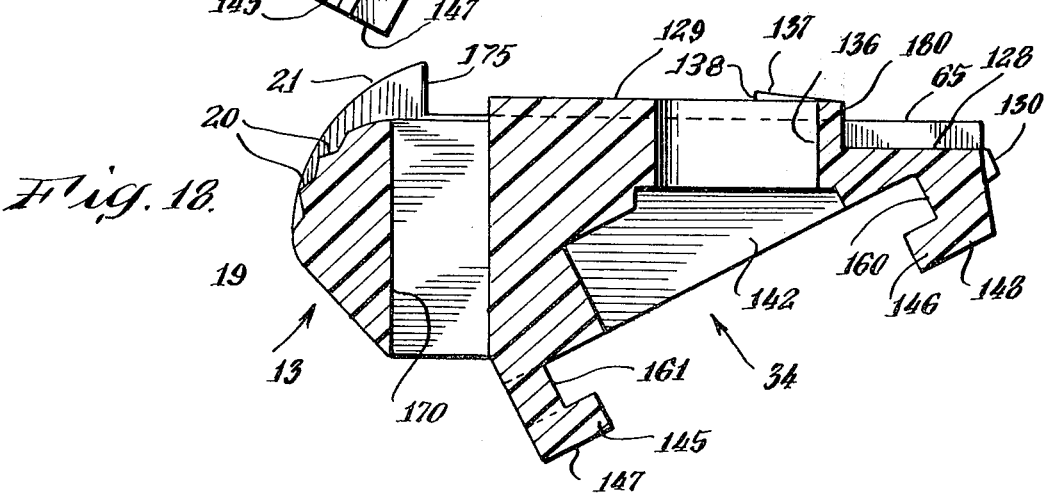

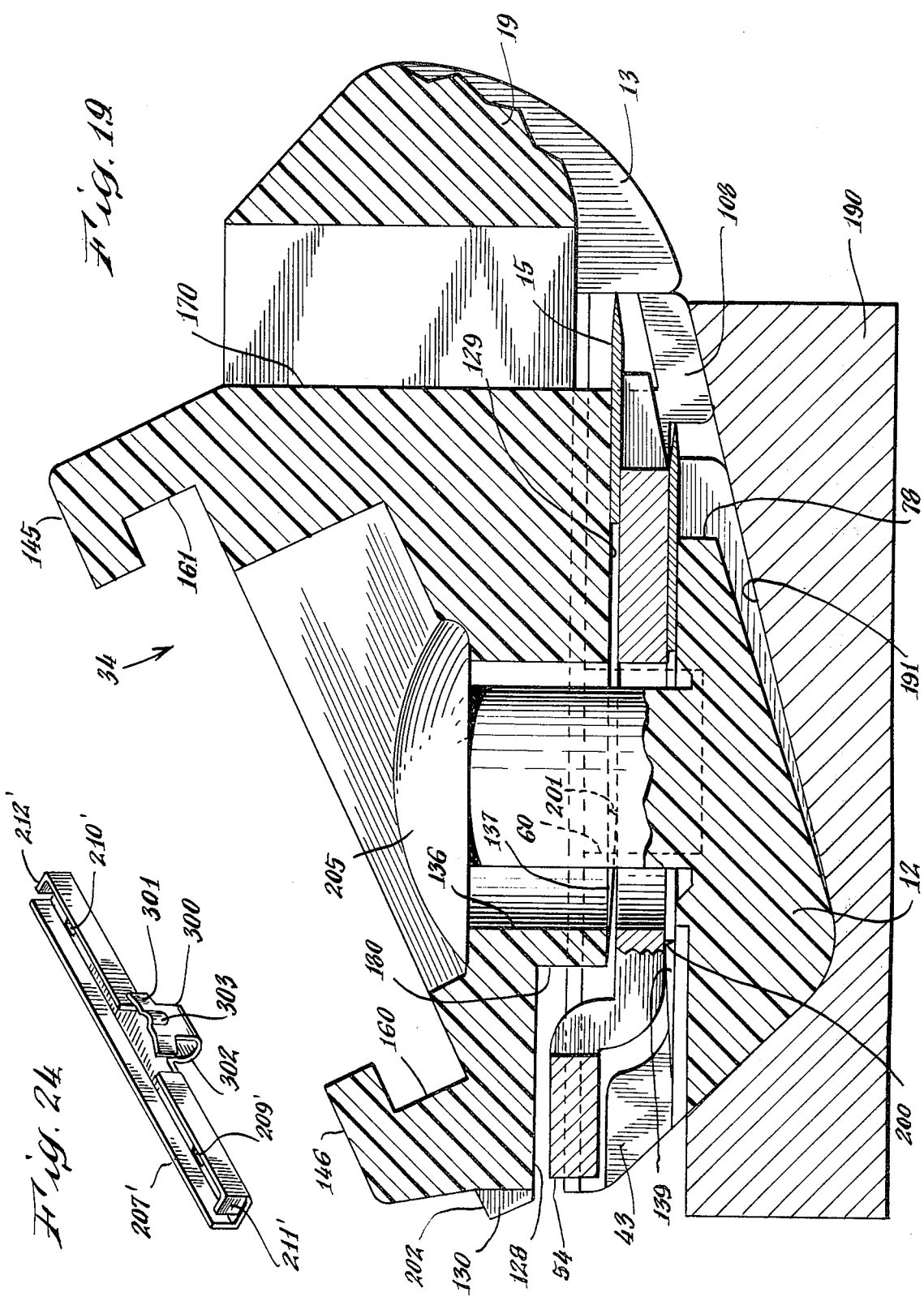

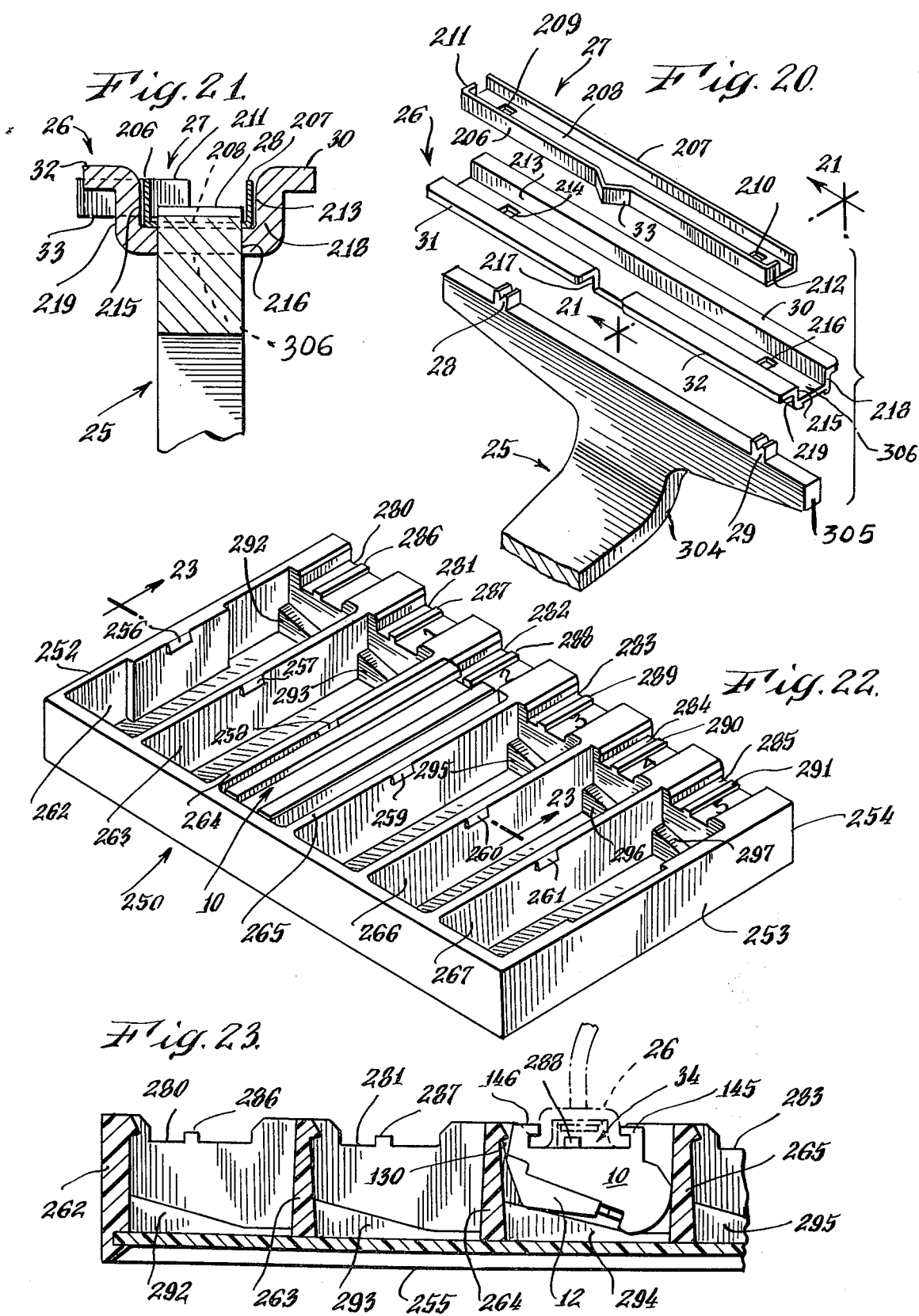

3,934,339

RAZOR BLADE CARTRIDGE

CROSS-REFERENCE TO RELATED APPLICATION

This application is a continuation of U.S. application Ser. No. 191,665, filed Oct. 22, 1971, now U.S. Pat. No. 3,783,510.

BACKGROUND OF THE INVENTION

1. Field of the Invention

The present invention relates to safety razors of the type having at least one blade permanently bonded in a disposable cartridge. More particularly, the present invention relates to a plurality of tandemly mounted blades permanently bonded in a disposable cartridge.

2. Description of the Prior Art

It is known to permanently bond a blade having a single edge in a disposable cartridge. For example, U.S. Pat. Nos. 2,654,148 and 3,388,831 each disclose a razor blade permanently bonded in a disposable cartridge. Typically, a safety razor has a guard surface situated downwardly and outwardly from the cutting edge of a blade and parallel to the cutting edge. The guard surface may be of the comb variety such as in U.S. Pat. No. 2,654,148, or formed by the outer surface of an elongated guard bar such as shown in U.S. Pat. No. 3,388,831. An advantage of a blade permanently bonded in a cartridge is that it is possible to optimize the shaving angle defined by the relationship between the cutting edge and the guard surface to minimize the possibility of nicks and cuts and to maximize shaving efficiency.

Tandemly mounted blades wherein the sides of the blades are parallel and the cutting edges of the upper blade is positioned upwardly and inwardly from the bottom blade are known in the art such as U.S. Pat. No. 3,262,206 and British Patent No. 772,532. Each of these patents teach bonding the tandemly mounted blades together to thus maintain the cutting edges in a predetermined relationship. The distance between the tandemly mounted blades should be dimensioned to provide efficient shaving action as determined by the density, location and coarseness of the hair. For example, British No. 772,532 discloses specific embodiments wherein this distance varies from about 0.036 inch to about 0.044 inch.

SUMMARY OF THE INVENTION

In accordance with the present invention, there is provided a pair of single edge blades vertically separated by a spacer, and a blade seat member and a cap member which sandwich the blades and spacer therebetween. Means extend upwardly from the blade seat member and abut the rear surface of the bottom blade for preventing rearward movement of the bottom blade, and the cutting edges of the two blades are in abutting engagement with a respective pair of spaced stop surfaces.

In accordance with another aspect of the present invention, the cartridge also includes means extending downwardly from the cap member and in abutting engagement with the rear edge of the top blade for preventing rearward movement of the top blade.

Thus, the invention provides for preventing rearward movement of the blades during use, and thereby minimizes the possibility of dangerous shave angles developing during use by such rearward movement.

BRIEF DESCRIPTION OF THE DRAWINGS

FIG. 1 is a perspective view of a specific embodiment of the present invention showing a disposable cartridge and a holder therefor;

FIG. 2 is a perspective view of a cartridge cap member;

FIG. 3 is a top view of the cap member;

FIG. 4 is a front elevational view of the cap member;

FIG. 5 is a bottom view of the cap member;

FIG. 6 is a sectional view of the cap member taken along Line 6—6 of FIG. 4;

FIG. 7 is a perspective view of a blade suitable for use in the specific embodiment;

FIG. 8 is a cross-sectional view taken along Line 8—8 of FIG. 7;

FIG. 9 is a perspective view of a blade spacer;

FIG. 10 is a top view of the spacer;

FIG. 11 is a side elevational view of the spacer;

FIG. 12 is a cross-sectional view of the spacer taken along Line 12—12 of FIG. 11;

FIG. 13 is a perspective view of a blade seat member;

FIG. 14 is a top view of the blade seat member;

FIG. 15 is a front plan view of the blade seat member;

FIG. 16 is a bottom view of the blade seat member;

FIG. 17 is a side view of the blade seat member;

FIG. 18 is a cross-sectional view of the blade seat member taken along Line 18—18 of FIG. 14;

FIG. 19 is a sectional view of the cartridge positioned in an assembly stand;

FIG. 20 is an exploded perspective view of the top of the holder;

FIG. 21 is a sectional view of the holder taken along Line 21—21 of FIG. 20;

FIG. 22 is a perspective view of a cartridge dispenser;

FIG. 23 is a sectional view taken along Line 23—23 of FIG. 22; and

FIG. 24 is an alternative embodiment of a spring assembly.

DESCRIPTION OF SPECIFIC EMBODIMENTS

FIG. 1 shows in an exploded view a cartridge 10 and a cartridge holder 11 constructed in accordance with the present invention. With reference to FIG. 1, the blade cartridge 10 has a pair of tandemly mounted blades 14, 15 bonded permanently between a cap 12 and a blade seat 13. The blades 14, 15 each have a single cutting edge and are maintained in a separated state by a spacer 16 to be described in more detail hereinafter. Ten spacer teeth 17—1 to 17—10 are shown in FIG. 1 protruding a slight distance from beneath the cutting edge of the top blade 14, but not to the cutting edge of the bottom blade 15. The cartridge 10 also has six ports 18—1 to 18—6 at the rear of the cap 12. As will be described hereinafter, shaving residue including shaving cream and cut hair passes through the ports 18—1 to 18—6 from channels formed between adjacent pairs of the teeth 17—1 to 17—10 and on the outside of the teeth.

A guard bar 19 having a plurality of longitudinal serrations 20 extends between stop portions 21, 22 of the blade seat 13. The guard bar 19 is spaced from the body portion of the blade seat 13 by a plurality of ribs 23 such that shaving residue can flow from the cutting edge of the bottom blade 15 downwardly between the guard bar 19 and the blade seat 13.

The holder 11 includes a handle 24 to which a frame member 25 is secured. A generally U-shaped channel member 26 and a latch or spring member 27 is secured to the upper portion of the frame 25 by displacing or deforming frame extensions 28, 29 which extend from the frame through the channel and latch members 26, 27.

The upper portion of the U-shaped channel member 26 has a rearwardly extending flange portion 30 and forwardly extending flange portions 31, 32. The forwardly extending flange portions 31, 32 have a space therebetween through which a latch or spring 33 of the member 27 extends.

The cartridge 10 is removably secured to the holder 11 by sliding the flange portions 30, 31, 32 into a T-shaped channel 34 formed traversely along the underside of the blade seat 13. As the channel member 26 is moved traversely of the cartridge 10 the spring 33 is biased rearwardly until it moves forward into biasing engagement in a recess 35 (FIG. 16) formed in the T-shaped channel 34.

The cap 12 is shown in more detail in FIGS. 2 – 6, and can be formed of molded plastic. With references to FIGS. 2 – 6, the cap 12 has a rear downwardly extending top surface 36 and a front downwardly extending top surface 37. As shown in FIG. 6, the slope of the rear top surface 36 is greater than the slope of the front top surface 37. Four posts 38 – 41 extend downwardly from the underside of the cap 12, and, as will be described hereinafter, are used to bond the cap 12 to the blade seat 13 and thereby bond the blades 14, 15 and spacer 16 in the cartridge 10.

The ports 18—1 to 18—6 are formed in the rear top surface 36 of the cap 12 and are defined by downwardly extending cap members 42 – 46 and by an instep 47, 48 formed beneath each shoulder 49, 50 of the cap 12. As shown in FIG. 5, the bottom surface of each of the downwardly extending cap members 42 – 46 and of the insteps 47, 48 are rectangular, and as shown in FIG. 4, these bottom surfaces lie in a horizontal plane. As shown in FIG. 6, each of the downwardly extending cap members 42 – 46 and of the insteps 47, 48 are curved at 52 and have a forwardly and upwardly curved surface 53. The forwardly and upwardly curved surface 53 of each of the downwardly extending cap members 42 – 46 and of the insteps 47, 48 define a transverse surface, interrupted only by the ports 18—1 to 18—6, which extend in facing relationship to the rear surfaces of vertically extending members 97 – 101, 104; 105 (FIG. 9) of the spacer 16 described hereinafter.

As shown in FIG. 6, each of the cap shoulders 49, 50 has an upper surface 55, 56 which extends downwardly and forwardly at a slope less than that of the front top surface 37 of the cap 12. The front end of each of the shoulders 49, 50 terminates in a vertically extending surface 57, 58. Further, each of the shoulders 49, 50 has a cut-out portion 59, 60 in the underside thereof which is used for assembly as will be described hereinafter. The bottoms of the shoulders 49, 50 are formed of horizontal surfaces 61, 62; 63, 64 which are disposed in opposing relationship to horizontal blade seat ledges 65, 66 (FIG. 13).

Each of the shoulders 49, 50 has inner vertical surfaces 67, 69; 68, 70 which extend upwardly from the bottom horizontal surfaces 62, 61; 64, 63 and which are also interrupted by the cut-out portions 59, 60. The forward vertical inner surfaces 69, 70 are interconnected by a forward horizontal transverse surface 71, and the rear vertical inner surfaces 67, 68 are interconnected by a rear horizontal transverse surface 72. The forward and rear horizontal transverse surfaces 71, 72 are provided for abutting engagement with the top surface 73 (FIG. 7) of the top blade 14 (FIG. 1) when the blade cartridge 10 is assembled.

The shoulders 49, 50 each have a shoulder instep defined by a curved forward surface 74, 75 (FIG. 6) extending perpendicularly inwardly from a respective vertical inner surface 60, 70, and a vertical surface extending rearwardly to a front edge portion 78 of the front top surface 37 of the cap 12. As shown in FIG. 6, the vertical surfaces 76, 77 also extend above the front top surface 37 to a point in the vicinity of the top of the cap 12.

A pair of top blade rear edge stops 79, 80 extend downwardly from the rear horizontal transverse surface 72. As shown in FIG. 6, each of the stops 79, 80 has an upwardly and forwardly curved front surface 81. During assembly the rear edge 82 (FIG. 8) of the top blade is positioned in abutting engagement with the curved front surfaces 81 of the steps 79, 80 to prevent the top blade from moving rearwardly out of position during use.

A suitable structure for the top and bottom blades 14, 15 is shown in FIGS. 7 and 8. With reference to FIG. 7, each blade has cut-out portions 83, 84 formed in the sides thereof which can be used during assembly as will be described hereinafter. The top and bottom blades 14, 15 also have cut-out portions 85 – 88 which extend about the posts 38 – 41 of the cap 12 as will be described hereinafter.

The spacer 16 which can be composed of metal, for example aluminum, or other material such as plastic, is shown in FIGS. 9 – 12. With reference to FIGS. 9 – 12, the spacer 16 has a rearwardly extending flange 89 defined by parallel upper and lower surfaces 90, 91 and a vertical transverse surface defining a rear edge 54 of the spacer 16. Five spacer elements 92 – 96 are joined to the flange 89 by vertically extending members 97 – 101, and extend forwardly from and parallelly with the flange 89. A pair of stop elements 102, 103 are also connected to the flange 89 by vertically extending members 104, 105 and extend forwardly from and parallelly to the flange 89. As shown in FIG. 10, generally rectangular and rearwardly extending channels 118 – 123 are formed between the spacer elements 92 – 96 and stop elements 102, 103.

Each of the stop elements 102, 103 has a cut-out portion 106, 107 which can be used for assembly purposes as will be described hereinafter. Further, each of the stop elements 102, 103 has a top blade stop 108, 109 at the forward end thereof. As shown in FIG. 12, each of the stops 108, 109 has a vertical rear surface against which the cutting edge 112 of the top blade 14 is in abutting engagement after assembly.

The four outer spacer elements 92, 93, 95, 96 each has a hole 113 – 116 extending vertically therethrough for positioning the spacer 16 over the posts 38 – 41 of the cap 12 during assembly as will be described hereinafter. The under surfaces of the spacer elements 92 – 96 and of the stop elements 102, 103 are positioned on the upper surface of the bottom blade 15, and the top blade 14 is positioned on the upper surfaces of the spacer elements 92 – 96 and of the stop elements 102, 103. When the spacer 16 is thus positioned between the blades 14, 15, the channels 118 – 123 provide shaving residue flow paths between the blades to the ports 18—1 to 18—6 of the cap 12.

With reference to FIG. 10, the front end of each spacer element 92 – 96 has a vertical surface 127 which lies in a plane to the rear of a plane defined by the rear vertical surfaces 110, 111 of the blade stops 108, 109. Thus, the front vertical surface 127 of each of the spacer elements 92 – 96 is to the rear of the cutting edge of the top blade 14. Each of the spacer elements 92 – 96 has a pair of forwardly projecting teeth 125, 126 (FIG. 10) extending forwardly of the front vertical surface 127 such that they protrude slightly from beneath the cutting edge of the top blade 14 as shown in FIG. 1 (17—1 to 17—10). The teeth 125, 126 are beveled as shown to provide reliefs and thereby aid in the flow of shaving residue to the spacer channels 118 – 123. Each of the stop elements 102, 103 also have a beveled relief inner portion 124 to aid in the flow of shaving residue to their respective spacer channels 118, 123.

The blade seat 13 which can be suitably composed of molded plastic is shown in detail in FIGS. 13 – 18. With reference to FIGS. 13 – 18, the blade seat 13 has a plateau 129 extending transversely of the blade seat between the blade seat ledges 65, 66, and positioned rearwardly from the blade seat stops 21, 22. A pair of vertically rising bottom blade rear edge stops 137, 139 are formed on the plateau 129. Each of the stops 137, 139 has a curved forwardly facing surface 138. The bottom blade 15 is positioned on the plateau 129 such that the cutting edge thereof is in abutting engagement with a vertical rear surface 175, 176 on each of the stops 21, 22, and such that the rear edge of the bottom blade 15 is in abutting engagement with the curved front surface 138 of each of the rear edge stops 137, 139.

Four vertically extending holes 133 – 136 are formed in the blade seat 13 for positioning the blade seat 13 on the posts 38 – 41 of the cap 12 during assembly as will be described hereinafter. A plurality of ribs 23 maintain the guard bar 19 forwardly in spaced relationship to the blade seat 13 such that a plurality of downwardly extending openings 170 are formed between the blade seat 13 and the guard bar 19 to provide a flow path for shaving residue beneath the cutting edge of the bottom blade 15. As shown in FIG. 14, the plateau 129 may have a pair of rectangularly shaped recesses formed at the rear end thereof to provide clearance for assembly purposes as will be described hereinafter.

With reference to FIGS. 16 and 18, three supporting ribs 140 – 142 are formed in the underside of the blade seat 13 and have lower surfaces in the plane defined by the upper plane of the T-shaped channel 34 as viewed in FIG. 18.

The T-shaped channel 34 is formed by downwardly and rearwardly extending members 160, 161 having parallel inner walls, and of opposing inwardly directed members 145, 146 extending from the lower portion of the members 161, 160. The outer side walls 143, 144 of the blade seat 13 extend downwardly and have lower surfaces in the upper plane of the T-shaped channel 34 as viewed in FIG. 18. Extending transversely of the bottom of the blade seat 13 are surfaces 147, 148 which also lie in the upper plane of the T-shaped channel 34 as viewed in FIG. 18. As shown in FIGS. 16 and 17, channel stops 150, 151 extend downwardly from the lower surface of the side wall 144 for abutting engagement with the left sides of the rearwardly and forwardly extending flanges 30, 31 (FIG. 1) to prevent passage of the U-shaped channel member 26 out the left side of the T-shaped channel 34.

A boss 130 (FIGS. 16 and 17) extends rearwardly from the blade seat 13. The boss 130 can be used to secure the cartridge 10 in a dispenser (FIG. 22) as will be described hereinafter.

With reference to FIG. 19, the cartridge 10 can be assembled by positioning the cap 12 in a mounting block 190 having an inner contour 191 matching the upper contour of the cap 12. Vertically extending guide members (not shown) are positioned in the cut-out portions 59, 60 (FIG. 5) of the cap 12. The top blade 14 is placed on the cap member with the side cut-out portions 83, 84 (FIG. 7) positioned over the cut-out portions 59, 60 of the cap 12 by means of the guide members (not shown). When the top blade 14 is in this position the rear upper surface of the top blade 14 is positioned on top of the blade rear edge stops 79, 80, and the posts 38 – 41 extend through the blade cut-out portions 85 to 88. The spacer 16 is next positioned in inverted fashion on the guide members (not shown) by means of the spacer cut-out portions 106, 107 (FIG. 9). Then the bottom blade 15 is also positioned by means of the guide members (not shown) extending through the cut-out portions 83, 84 (FIG. 7) such that the top surface of the blade rests against the lower surfaces of the spacer elements 92 – 96 and stop elements 102, 103 with the posts 38 – 41 extending vertically through the holes in the spacer elements 92, 93, 95, 96 and the cut-out portions 85 – 88 of the bottom blade 15. The blade seat 13 is then positioned with the posts 38 – 41 extending through the blade seat holes 133 – 136. The blade seat 13 can also have cut-out portions (not shown) in the outer side walls thereof for engagement with the vertically extending guide members (not shown) for initial positioning of the blade seat relative to the other components of the cartridge 10.

At this time, a force is applied to the underside of the blade seat 13 to maintain the cartridge components in a relative position as determined by the guide members (not shown). Following this, the guide members (not shown) are removed. When the guide members (not shown) are removed, three wafer-like vertically stacked fingers (not shown) are inserted through at least two rear ports, for example ports 18—2 and 18—5. Each pair of fingers (not shown) are of a different length and engage the rear edges of the blades 14, 15 and portions of the vertically extending members, for example the edges of members 97 and 98 about the channel 119 and the edges of members 100 and 101 about the channel 122. One pair of fingers (not shown) push the lower blade forwardly until the cutting edge thereof is in abutting engagement with the vertical rear surfaces 175, 176 of the blade seat stop members 21, 22 and the rear edge thereof is positioned forwardly of the peak of the bottom blade rear edge stops 137, 139 such that the rear edge is in abutting engagement with the forward portion of the stops 137, 139. A second pair of fingers (not shown) push the spacer 16 forwardly until the front surfaces of the top blade stops 108, 109 on the spacer 16 are in abutting engagement with the vertical rear surfaces of the blade seat stop members 21, 22. The remaining pair of fingers engage the rear edge of the top blade 14 to push the top blade 14 forwardly until the cutting edge thereof is in abutting engagement with the vertical rear surfaces 110, 111 of the top blade stops 108, 109, and the rear surface of the top blade 14 is forward of the peak of the top blade rear edge stops 79, 80 and in abutting engagement with a portion of the curved front surface 200 on each of the stops 79, 80. After the fingers (not shown) are removed, the lower portions of the posts 38 – 41 are staked, for example by ultrasonic, mechanical or heat energy, to deform the lower ends thereof such as shown at 205 (FIG. 19), and thus bond the components of the cartridge together. Thus, a cartridge assembled as described with reference to FIG. 19 provides an assembly designed for preventing any movement of the blades 14, 15 after staking. This feature is important to maintain a predetermined cutting angle for each of the cutting edges of the blades 14, 15 and also for safety reasons. For example, if the bottom blade 15 moves rearwardly, the cutting edge of the top blade 14 can be exposed to such an extent that there is a danger of serious nicks and cuts.

With reference to FIGS. 21 and 22, the frame 25 is curved forwardly at 304 which in turn extends outwardly to form a transverse support member 305. The two vertical extensions 28, 29 extend upwardly from the top surface of the support member 212. The U-shaped channel member 26 is positioned on the support member 212 by inserting the extensions 28, 29 through corresponding holes 214, 216 in a lower horizontal transverse portion 306 of the channel member 26. The latch or spring member 27 is then positioned in the channel member 26 with the extensions 28, 29 extending through holes 209, 210 formed in a lower horizontal portion 208 of the spring member and with the outer surface of a vertically extending wall member 207 in opposing relationship with the inner surface of a vertically extending rear wall 218 of the channel member 26. A forward vertically extending wall 206 of the spring member 27 has the spring 36 formed therealong and has a stop member 211, 212 at each end thereof extending rearwardly. When the spring member 27 is seated in the channel member 26, the spring 33 extends through an opening 217 formed in the forwardly extending flanges 31, 32 and in the vertical forward wall 219 of the U-shaped channel member 26. When thus positioned, the vertical extensions 28, 29 are staked or otherwise deformed to secure the spring member 27 and the channel member 26 to the support member 212.

FIG. 24 shows an alternative embodiment of a spring member with components corresponding to the spring member 27 having corresponding primed numbers. The spring of FIG. 24 differs from that of FIG. 20 in that the spring extends downwardly and upwardly from the horizontal lower surface in a U-shaped manner and terminates at the upper end thereof in a pair of rearwardly formed ears 301, 302 having a forwardly deformed portion 303 for engagement in the recess 35 (FIG. 16) in the T-shaped channel 34.

A dispenser 250 suitable for storing unused and used cartridges is shown in FIGS. 22 and 23. With reference to FIGS. 22 and 23, the dispenser 250 has a pair of opposed end walls 252, 253 and a pair of opposing side walls 254, 255. Cartridge chambers are formed within the dispenser 250 by transverse partitions 263 – 267. Each of the chambers has a pair of wedge-shaped rest members 292 – 297 formed along the inside surfaces of the side walls 254, 255 and extending from the upper wall or partition 252, 263, 264, 265, 266, 267 in a downwardly extending fashion in the direction of a bottom panel 255. The wedge-shaped members along the inside surface of the side wall 255 cannot be seen in perspective view of FIG. 22. A stop 256 – 261 is formed on the top portion of each of the end wall 256 and partitions 263 – 267. The side wall 254 has a plurality of channels 280 – 285 formed transversely in the top surface thereof. Each of the channels 280 – 285 has an upwardly extending transverse guide member 286 – 290.

By way of example, the dispenser 250 can initially have a cartridge in each of the chambers identified by one of numerals 1 – 5 in their respective channels 281 – 285. A new holder 11 may have a dummy cartridge (not shown) having the same general outer configuration as that of the cartridge 10. The dummy cartridge (not shown) or a used cartridge (not shown) from a prior dispenser is inserted in the top chamber to the left of the channel 280 by initially inserting the guard bar portion in the chamber and rotating the holder 11 in a counter-clockwise manner as viewed in FIG. 23 until the boss 130 snaps under the stop 256. In this position, the cap member and the guard bar rest on the pair of wedge-shaped support members 292. The holder 11 can then be slid to the right with the channel member 26 passing outwardly through the channel 280 of the side wall 254.

It will be noted that each of the channel guide members 286 – 290 is positioned off-center of the axis of each of the channels 280 – 285. The offset of each of the guide members 286 – 290 is chosen to permit passage of the stop members 211, 212 of the spring 27 through only the portion of the channel as indicated by the numerals. Thus the combination of the guide members 286 – 290 and of the stops 211, 212 preclude inserting a cartridge in an upside-down position on the holder 11.

As shown in FIG. 23, a new cartridge is removed by positioning the left portion of the channel member 26 in one of the channels indicated by a reference numeral and sliding the holder 11 to the left in sliding engagement with the T-shaped channel 34 formed in the underside of the cartridge. The new cartridge is then removed from the chamber by rotating the holder clockwise as viewed in FIG. 23 until the boss 130 snaps out of engagement with the stop 258 and the holder may then be lifted upwardly for use. It will be noted that when the cartridge is positioned in the chambers, the cutting edges of the blades are not in contact with any surfaces of the chamber.

The reference numerals shown in the channels of FIG. 22 are provided as a guide for use. Specifically, a dummy cartridge or a used cartridge is initially placed in the chamber defined by the channel 280 and the unused cartridge in the chamber defined by channel 281 having numeral 1 therein is first used. Then this cartridge is returned to the chamber corresponding to the channel 281 and the next cartridge to be used is that indicated by numeral 2 in the channel 282. This process is continued until all of the cartridges are used.

It is obvious that more than two blades can be tandemly mounted in accordance with the present invention. If more than two blades are bonded in a cartridge, a spacer such as described hereinabove is positioned between opposing surfaces of the blades.

What is claimed is:

1. A razor blade cartridge comprising:
    an elongated plastic blade seat member having an elongated guard surface defining a front surface of said blade seat member;

a bottom blade having an elongated cutting edge and a rear edge opposite said bottom blade cutting edge, said bottom blade being located on said blade seat member with said bottom blade cutting edge spaced upwardly and rearwardly of said guard surface;

an elongated spacer member located on said bottom blade;

a top blade having an elongated cutting edge and a rear edge opposite said top blade cutting edge, said top blade cutting edge being spaced upwardly and rearwardly of said bottom blade cutting edge;

a cap member located on said top blade including means extending downwardly from said cap member in abutting engagement with the rear edge of said top blade for preventing rearward movement;

means including a first pair of spaced stop surfaces for abutting engagement with said bottom blade cutting edge;

means including a second pair of spaced stop surfaces for abutting engagement with said top blade cutting edge;

a pair of spaced elements integrally molded with and extending upwardly from said blade seat member beneath said spacer member and in abutting engagement with the rear surface of said bottom blade for preventing rearward movement of said bottom blade;

means for permanently bonding said bottom blade, said spacer member, and said top blade between said blade seat member and said cap member; and means for releasably engaging a cartridge holder.

2. The cartridge of claim 1 wherein said first pair of spaced stops are formed on said blade seat member.

3. The cartridge of claim 1 wherein said second pair of spaced stops are formed on said spacer member.

4. The cartridge of claim 1 wherein said bonding means comprises a plurality of posts, and said top and bottom blades each comprises a plurality of apertures; said apertures being initially situated about said posts to permit forward movement of said top and bottom blades, and thereafter said bottom blade being pushed forward during assembly to place said bottom blade cutting edge in abutting engagement with said first pair of spaced stops and to position the rear surface of said bottom blade in abutting engagement with said bottom blade movement preventing means.

5. The cartridge of claim 4 wherein said cap member further comprises apertures for exposing the rear edges of said top blade and said bottom blade and through which said top blade and said bottom blade are pushed forwardly.

* * * * *